Aug. 1, 1967  C. BAUR ETAL  3,333,785
FILM CARTRIDGE
Filed Nov. 30, 1965
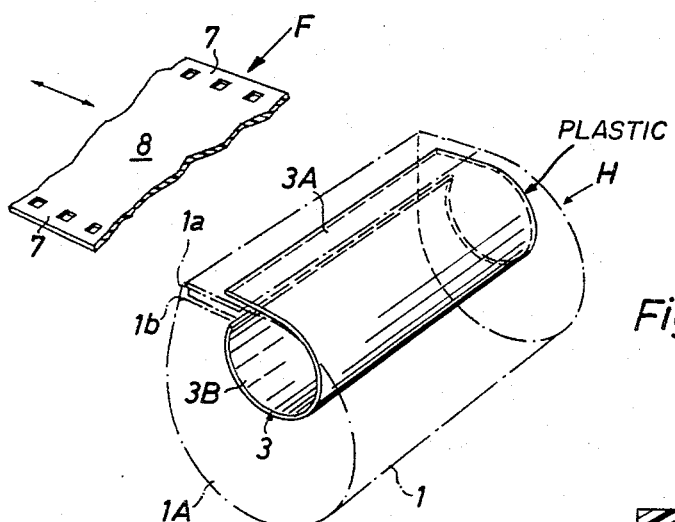
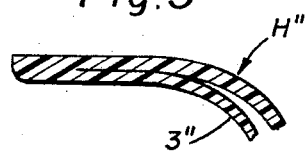
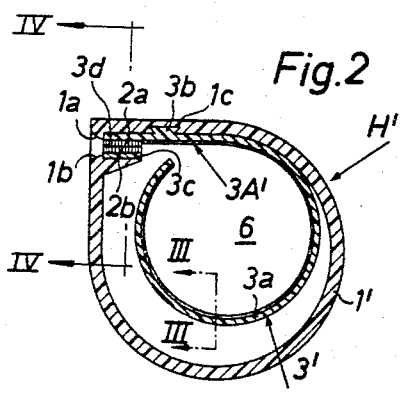
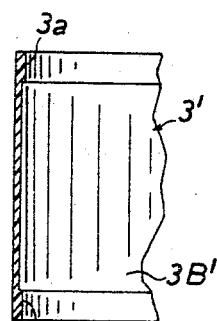
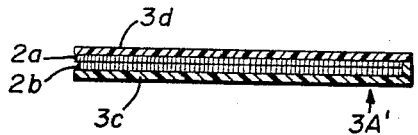
INVENTOR.
CARL BAUR
FRITZ ARLET
BY United States Patent Office 3,333,785
Patented Aug. 1, 1967

3,333,785
FILM CARTRIDGE
Carl Baur, Baldham, and Fritz Arlet, Munich, Germany, assignors to Agfa-Gevaert A.G., Leverkusen, Germany
Filed Nov. 30, 1965, Ser. No. 510,629
Claims priority, application Germany, Dec. 4, 1964, A 22,881
5 Claims. (Cl. 242—71.1)

The present invention relates to coreless film cartridges wherein a strip of photographic roll film may be coiled without being connected to a rotary spool, and more particularly to an improved film coiling spring which may be used in coreless film cartridges.

It is already known to provide a coreless film cartridge with one or more metallic springs which are inserted into the chamber defined by the housing of the cartridge and are secured to the housing by rivets, by welding or in another suitable way. The film which is fed lengthwise through the mouth of the film cartridge is caused to slide along the concave inner sides of the springs and is compelled to form convolutions. The convolutions are packed in response to the bias of springs which bear against the outermost convolution of the resulting film package.

A serious drawback of conventional metallic film coiling springs is that their rolling action is not uniform because they engage only a portion of the outermost film convolution. Were a metallic spring made as wide as the film, its bias would be too strong and the spring would be likely to scratch the film surface. Attempts to produce film coiling springs of plastic material by bending an originally flat plastic sheet into the form of a coil have met with little success because the inner layer of the thus deformed sheet is compressed and the outer layer is expanded so that, even when the coiled sheet is not in contact with the film, its material is subjected to unequal stresses in different zones thereof. The characteristics of such plastic springs do not vary in a predictable way so that their bias changes at other than optimum rate when the film is being convoluted into a cylindrical package or roll of gradually increasing diameter and tends to expand the plastic spring.

It is an object of the present invention to provide a simple, inexpensive, easy-to-install and lightweight film coiling spring which can be conveniently installed in or produced simultaneously with presently known film cartridges, which is capable of subjecting the film to such stresses which invariably insure the formation of a satisfactory roll, and to provide a novel connection between the spring and the housing of a film cartridge.

A further object of the instant invention is to provide a film coiling spring which, in addition to serving as a means for automatically convoluting a length of perforated photographic film, can simultaneously perform one or more additional functions and which is constructed and configurated in such a way that its material is not subjected to any appreciable internal stresses when the cartridge is empty.

Still another object of the invention is to provide a spring which cannot scratch or otherwise damage that portion of the film which is to be exposed to light rays when the user of the camera which accommodates the cartridge wishes to take one or more pictures.

Briefly stated, one feature of our invention resides in the provision of a coreless film cartridge which comprises a housing defining a film chamber and including a substantially tubular mantle provided with an elongated axially parallel mouth through which the film may be fed lengthwise into or withdrawn from the chamber, and an arcuate film coiling spring accommodated in the chamber and consisting of elastomeric plastic material. The axial length of the coiled spring at least approximates the width of the film and at least one axial end of the spring is preferably provided with a raised portion which engages the corresponding perforated marginal portion of the film so that the central portion of the film need not come in actual contact with the spring.

The invention will be described in detail with reference to the accompanying drawings, in which:

FIG. 1 is a perspective view of a film cartridge whose housing accommodates a film coiling spring which is constructed and mounted in accordance with a first embodiment of our invention, the housing of the cartridge being indicated by phantom lines;

FIG. 2 is a transverse section through a film cartridge whose housing accommodates a modified spring;

FIG. 3 is a fragmentary section through the spring substantially as seen in the direction of arrows from the line III—III of FIG. 2;

FIG. 4 is a sectional view of the spring substantially as seen in the direction of arrows from the line IV—IV of FIG. 2; and FIG. 5 is a fragmentary transverse sectional view of a housing which is integral with a spring.

Referring first to FIG. 1, there is shown a film takeup cartridge having a housing H which includes a substantially tubular mantle 1 provided with an axially parallel mouth extending between the lips 1a, 1b. The housing H further comprises two end walls 1A and its internal chamber accommodates a novel film coiling spring 3 one end portion 3A of which is bonded or otherwise attached to the mantle 1 in a zone adjacent to and located at one side of the mouth. The concave inner side 3B of the spring 3 faces the mouth so that a film F which is fed lengthwise through the slit between the lips 1a, 1b will slide along the inner side 3B and will form a roll consisting of a series of tightly packed convolutions. The axial length of the spring 3 equals or at least approximates the length of the mouth, i.e., the width of the film F, so that each zone of the outermost film convolution in the chamber of the housing H is subjected to identical stresses. This insures that the convolutions of the film F are tightly packed in the space which is surrounded by the inner side 3B of the coiled spring 3.

FIG. 2 illustrates a somewhat modified film cartridge whose housing H' comprises a plastic mantle 1' provided with two axially parallel lips 1a, 1b which extend along the opposite sides of the mouth. The mouth accommodates two elongated sealing strips 2a, 2b which preferably consist of plush, velvet or similar material and serve to prevent entry of light rays into the chamber 6. The film coiling spring 3' is substantially identical with the spring 3 of FIG. 1 but its end portion 3A' is provided with one or more axially parallel dovetailed projections or ribs 3b which extend into a complementary groove or channel 1c provided in the internal surface of the mantle 1'. The projections 3b may be slid into the groove 1c before the one or the other end wall of the housing H' is attached to the respective axial end of the mantle 1'. The end portion 3A' of the spring 3' resembles a U-shaped body (see FIG. 4) having two elongated legs 3c, 3d each of which is connected with one of the sealing strips 2a, 2b, for example, by means of a suitable adhesive. The legs 3c, 3d extend along the opposite sides of the mouth. An important advantage of such spring 3' is that the sealing strips 2a, 2b may be secured to the legs 3c, 3d before the spring is mounted in the chamber 6.

The groove 1c may be provided in one of the end walls which form part of the housing H.

In FIG. 3, there is shown a portion of the film coiling spring 3'. It will be noted that the inner side 3B' of the spring 3' is provided with two parallel raised portions or beads 3a each of which comes in contact with the corresponding perforated marginal portion 7 of the film F. In this way, the central portion of the inner side 3B' need not come in actual contact with the central portion 8 of the film F and the latter is even less likely to be scratched or otherwise damaged while it slides along the spring 3'.

In accordance with another feature of our invention which is shown in FIG. 5, the spring may be produced as an integral part of the housing so that the groove 1c and the projection or projections 3b shown in FIG. 2 may be dispensed with. In such film cartridges, the material of the housing H'' is the same as that of the spring 3''.

In producing the spring 3, or 3', we prefer to resort to an injection molding, extruding or molding method according to which the spring immediately assumes the form of a coil as shown in FIG. 1 or 2. This insures that the material of the spring is not subjected to any internal stresses when the chamber of the cartridge housing is empty, i.e., when the film does not tend to expand the spring. As mentioned hereinabove, a spring which is obtained by bending an originally flat sheet of metallic or plastic material comprises an inner layer which is under compression and an outer layer in which tensional stresses prevail. Such springs are not entirely satisfactory for coiling of roll film because their bias varies at an uncontrollable rate when the diameter of the film roll increases or decreases. It was further found that a plastic spring which consists of elastomeric material can be readily constructed and dimentioned to exert just as much pressure as is necessary to insure that the outermost convolution of the film roll is subjected to requisite stresses. The spring is self-supporting so that it can be readily manipulated during assembly with the housing of the film cartridge.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptions should and are intended to be comprehended within the meaning and range of equivalence of the following claims.

What is claimed as new and desired to be protected by Letters Patent is:

1. A film cartridge, comprising a housing defining a film chamber and including a substantially tubular mantle provided with an elongated axially parallel mouth through which the film may be fed lengthwise into or withdrawn from said chamber; and an arcuate film coiling spring accommodated in said chamber and consisting of elastomeric plastic material, said spring having an end portion integral with said housing adjacent to one side of and having a concave inner side facing said mouth, the axial length of said spring at least approximating the width of the film.

2. A coreless film cartridge as set forth in claim 1, wherein the end portion of said spring is integral with and consists of the same material as said mantle.

3. A film cartridge, comprising a housing defining a film chamber and including a substantially tubular mantle provided with an elongated axially parallel mouth through which the film may be fed lengthwise into or withdrawn from said chamber; an arcuate film coiling spring accommodated in said chamber and consisting of elastomeric plastic material, said spring having a U-shaped end portion secured to said housing adjacent to said mouth, said spring having a concave inner side facing said mouth and its axial length at least approximating the width of the film, said end portion of the spring resembling a U-shaped body and having a pair of legs extending lengthwise along the opposite sides of said mouth; and a pair of elongated sealing elements received in said mouth and each secured to one of said legs.

4. A film cartridge as set forth in claim 3, wherein the end portion of said spring comprises at least one projection and said mantle is provided with an axially parallel groove receiving said projection.

5. A cartridge for film of the type having perforations extending along at least one marginal portion thereof, comprising a housing defining a film chamber and including a substantially tubular mantle provided with an elongated axially parallel mouth through which the film may be fed lengthwise into or withdrawn from said chamber; and an arcuate film coiling spring accommodated in said chamber and consisting of elastomeric plastic material, said spring having an end portion secured to said housing adjacent to one side of said mouth and having a concave inner side which faces said mouth, the axial length of said spring at least approximating the width of the film and said inner side thereof being provided with a raised portion abutting against the film in the region of said perforations.

References Cited

UNITED STATES PATENTS

| | | | |
|---|---|---|---|
| 1,930,335 | 10/1933 | Bornmann | 242—71.1 |
| 2,032,213 | 2/1936 | Howell | 242—71.1 |

FOREIGN PATENTS

| | | |
|---|---|---|
| 622,646 | 5/1949 | Great Britain. |

FRANK J. COHEN, *Primary Examiner.*

N. L. MINTZ, *Assistant Examiner.*